United States Patent [19]

Grasselli et al.

[11] 3,911,039

[45] Oct. 7, 1975

[54] PROCESS FOR THE PREPARATION OF BUTADIENE FROM N-BUTENE

[75] Inventors: Robert K. Grasselli, Chagrin Falls; Harley F. Hardman, Lyndhurst, both of Ohio

[73] Assignee: The Standard Oil Company, Cleveland, Ohio

[22] Filed: Jan. 23, 1974

[21] Appl. No.: 435,841

[52] U.S. Cl. .............................. 260/680 E; 252/470
[51] Int. Cl. ............................................... C07c 5/18
[58] Field of Search ................................ 260/680 E

[56] References Cited
UNITED STATES PATENTS

| | | | |
|---|---|---|---|
| 3,414,631 | 12/1968 | Grasselli et al. | 260/680 E |
| 3,642,930 | 2/1972 | Grasselli et al. | 260/680 E |
| 3,764,632 | 10/1973 | Takenaka et al. | 260/680 E |
| 3,801,670 | 4/1974 | Shiraishi et al. | 260/680 E |
| 3,825,502 | 7/1974 | Takenaka et al. | 252/456 |

*Primary Examiner*—Paul M. Coughlan, Jr.
*Attorney, Agent, or Firm*—Herbert D. Knudsen

[57] ABSTRACT

Catalysts containing molybdenum, bismuth, iron and nickel, cobalt, magnesium, zinc, cadmium, manganese calcium or mixture thereof and an alkali metal or Tl are promoted by an element selected from antimony and tin to give highly desirable catalysts for the oxidative dehydrogenation of olefins of 4 to about 10 carbon atoms.

3 Claims, No Drawings

PROCESS FOR THE PREPARATION OF BOTADIENE FROM N-BUTENE

BACKGROUND OF THE INVENTION

The oxidative dehydrogenation of olefins is known, see for example U.S. Pat. Nos. 3,414,631 and 3,642,930. The process of the present invention is conducted within the parameters of the art, but uses a different catalyst.

SUMMARY OF THE INVENTION

It has been discovered in the process for the oxidative dehydrogenation of an olefinic hydrocarbon of 4 to about 10 carbon atoms comprising contacting a mixture of the olefin and molecular oxygen with a catalyst at a temperature of about 200° to about 600°C., the improvement comprising using as the catalyst a catalyst wherein the atomic ratios of the elements are described by the empirical formula

$$A_a\ C_c\ D_d\ Fe_e\ Bi_f\ Mo_{12}\ O_x$$

wherein A is tin, antimony or mixture thereof;
C is an alkali metal, Tl or mixture thereof; and D is nickel, cobalt, magnesium, zinc, cadmium, manganese, calcium or mixture thereof;
and wherein
  $a$ and $c$ are 0.01 to about 4;
  $d$ is 0.1 to about 20;
  $e$ and $f$ are 0.1 to 12; and
  $x$ is the number of oxygens required by the valence states of the other elements present.

The process of the invention gives highly desirable yields of the diolefin product, long catalyst life is realized and large volumes of product can be produced in a given period of time.

The present invention is the use of a different catalyst in the known oxidative dehydrogenation of olefins. The central aspect of this invention is the catalyst.

The catalyst is suitably any catalyst containing the combination of elements delimited by the formula above. Preferred are catalysts that contain nickel, cobalt, magnesium or mixture thereof and those catalysts that contain potassium.

The catalysts of the invention are conveniently prepared by any of the methods associated with the similar oxidation catalysts in the art. Among the method of combining the elements of the catalyst are the coprecipitation of soluble salts from a solution and the mixing of salts or oxides of the various compounds. After the elements of the catalyst are combined, the preparation of the catalyst is completed by calcination of the catalyst at an elevated temperature. Temperatures between about 200° and about 600°C. are most suitable.

Specific preparations of catalysts of the invention are shown in the specific embodiments. These preparations give preferred catalysts of the invention.

The catalysts of the invention may be used as pure catalytic material or they may be used in a supported form. Suitable support materials include silica, alumina, titania, zirconia, boron phosphate and the like. The use of catalysts supported on silica is preferred.

The oxidative dehydrogenation reaction of the invention is known. The invention is operated within the parameters of the art processes even though a different catalyst is employed.

Broadly, the reaction of the invention reacts an olefin of 4–10 carbon atoms with molecular oxygen, normally added as air, in the presence of a catalyst. The ratio of molecular oxygen is normally about 0.2 to about 6 moles of oxygen per mole of olefin, but ratios outside of this range are also conveniently used. The reactants could be diluted with a diluent such as steam.

Preferred reactants in the present invention are the n-butenes which are converted to butadiene by the process of the invention. Also preferred is the reaction of isoamylene to obtain isoprene.

The reaction is normally conducted at temperatures between about 200° and about 600°C., with temperatures of about 300° to about 500°C. being preferred. The reactants can be passed over the catalyst at an apparent contact time as low as a fraction of a second to 20 seconds or more. The reaction can be conducted in a fluid-bed or fixed-bed reactor at atmospheric, superatmospheric or subatmospheric pressure. Using these techniques, the reaction of the present invention gives highly desirable yields of diolefins from the corresponding olefin.

EXAMPLES 1–12

Oxidative Dehydrogenation With Various Catalysts of the Invention

Various catalysts of the invention were prepared as follows:

EXAMPLES 1–5

80% $Sb_{0.5}K_{0.1}Ni_{2.5}Co_{4.5}Fe_3BiMo_{12}O_x$ and 20% $SiO_2$

An aqueous slurry containing 63.54 g. $(NH_4)_6Mo_7O_{24}\cdot4_2O$, 52.06 g. of 40 percent Nalco silica sol and 2.19 g. of $Sb_2O_3$ was prepared. Separately, a solution containing 36.36 g. of $Fe(NO_3)_3\cdot 9H_2O$, 14.55 g. $Bi(NO_3)_e\cdot 5H_2O$, 39.29 g. $Co(NO_3)_2\cdot 6H_2O$, 21.81 g. of $Ni(NO_3)_2\cdot 6H_2O$ and 3.03 g. of a 10% $KNO_3$ solution was prepared. The solution was added to the slurry and the resulting mixture was evaporated to a paste material. The paste was dried overnight in an oven at 110°C. The dry material obtained was heated at 290°C. for 3 hours, 425°C. for 3 hours and 550°C. for 16 hours.

EXAMPLES 6–8

80% $Sn_{0.5}K_{0.1}Ni_{2.5}Co_{4.5}Fe_3 BiMo_{12}O_x$ and 20% $SiO_2$

The catalyst was prepared in the same manner as above except that 2.26 g. of $SnO_2$ was added instead of the antimony oxide.

EXAMPLE 9

80% $Sb_{0.5}K_{0.2}Ni_{2.5}Co_{4.5}Fe_3BiMo_{12}O_x$ and 20% $SiO_2$

The catalyst was prepared in exactly the same manner as above except that potassium nitrate was doubled.

EXAMPLES 10 and 11

80% $Sb_{0.5}Cs_{0.5}Ni_{2.5}Co_{4.5}Fe_3BiMo_{12}O_x$ and 20% $SiO_2$

The catalyst was prepared in the same manner as above except that 2.93 g. of a 10 percent solution of $CsNO_3$ was added instead of the potassium nitrate.

EXAMPLE 12

80% $Sb_{0.5}Tl_{0.2}Ni_{2.5}Co_{4.5}Fe_3BiMo_{12}O_x$ and 20% $SiO_2$

The catalyst was prepared in the same manner as Examples 1–5 except that 1.60 g. of $TlNO_3$ was added instead of potassium.

A reactor was constructed of a stainless steel tube having a 2.5 cc. zone for catalyst. A 20 by 30 mesh fraction of the catalyst was charged to the reaction zone, the reactor was brought to reaction conditions under a flow of air. The critical reaction parameters are given in the following Table. The catalyst is designated in the Table as $A_aNi_{2.5}Co_{4.5}Fe_3BiMo_{12}O_x$. It is understood that all catalysts contained 20 percent silica. Butene-2 was used as a mixture of 57.5 percent trans and 42.5 percent cis butent-2.

The results of these experiments are stated in the following terms:

$$\% \text{ conversion} = \frac{\text{olefin reacted} \times 100}{\text{olefin fed}}$$

$$\% \text{ selectivity} = \frac{\text{product recovered} \times 100}{\text{olefin reacted}}$$

$$\% \text{ single pass yield} = \frac{\text{product recovered} \times 100}{\text{olefin fed}}$$

EXAMPLE 13

Catalyst Containing More Silica

In the same manner as shown above, a catalyst containing 50 % silica was prepared. The active ingredients of the catalyst were $Sb_{0.5}K_{0.3}Ni_{2.5}Co_{4.5}Fe_3BiMo_{12}O_x$. Using an air-to-butene-2 feed of 31, a temperature of 350°C. and a contact time of 1 second, the conversion was 71.2 percent, the selectivity was 97 percent and the single pass yield was 68.9 percent.

EXAMPLE 14

Catalyst Containing Magnesium

In the same manner as shown above, a catalyst containing 80% $Sb_{0.5}K_{0.1}Mg_{5.5}Ni_{0.5}Co_{1.0}Fe_3BiMo_{12}O_x$ and 20% $SiO_2$ was prepared and tested according to the conditions of Example 13. The conversion was 85.0 percent, the selectivity 94 percent and the single pass yield to butadiene was 79.9 percent.

In the same manner, other catalysts of the invention can be prepared and used to produce butadiene from butene-2 or butene-1.

With various catalysts of the invention, it has been found that the treatment of the catalyst with a flow containing ammonia prior to the reaction at reaction temperature enhances the activity of the catalysts in the oxidative dehydrogenation. This treatment with ammonia can take place in the presence of air and/or a hydrocarbon.

We claim:

1. In the process for the oxidative dehydrogenation of n-butene to butadiene comprising contacting a mixture of the n-butene and molecular oxygen with a catalyst at a temperature of about 200° to about 600°C., the improvement comprising using as the catalyst a catalyst wherein the atomic ratios are described by the empirical formula $$Sb_1\ C_c\ D_d\ Fe_e\ Bi_f\ Mo_{12}\ O_x$$

wherein

C is an alkali metal, Tl or mixture thereof; and

D is nickel; cobalt, magnesium, zinc, cadmium, manganese, calcium or mixture thereof;

and wherein a and c are 0.01 to about 4;

d is 0.1 to about 20;

e and f are 0.1 to 12; and x is the number of oxygens required by the valence states of the other elements present.

2. The process of claim 1 wherein D is nickel, cobalt, magnesium or mixture thereof.

3. The process of claim 1 wherein C is potassium.

* * * * *

Table

Oxydehydrogenation of Butene Using $A_aNi_{2.5}Co_{4.5}Fe_3BiMo_{12}O_x$

| Example | Catalyst, $A_a=$ | Butene-X, X= | Air | Steam | Temp. °C. | C.T. Sec. | Conversion | Selectivity | Single Pass Yield |
|---|---|---|---|---|---|---|---|---|---|
| 1 | $Sb_{0.5}K_{0.1}$ | 1 | 11 | 0 | 350 | 1.0 | 100 | 90 | 90.3 |
| 2 | $Sb_{0.5}K_{0.1}$ | 2 | 11 | 0 | 350 | 1.0 | 96.5 | 92 | 88.9 |
| 3 | $Sb_{0.5}K_{0.1}$ | 2 | 31 | 0 | 350 | 1.0 | 99.9 | 90 | 90.1 |
| 4 | $Sb_{0.5}K_{0.1}$ | 2 | 31 | 0 | 340 | 1.0 | 96.3 | 93 | 89.7 |
| 5 | $Sb_{0.5}K_{0.1}$ | 2 | 80 | 0 | 350 | 0.6 | 94.9 | 88 | 83.6 |
| 6 | $Sn_{0.5}K_{0.1}$ | 1 | 11 | 4 | 350 | 1.0 | 98.7 | 97 | 95.7 |
| 7 | $Sn_{0.5}K_{0.1}$ | 1 | 31 | 0 | 400 | 1.0 | 96.4 | 90 | 86.2 |
| 8 | $Sn_{0.5}K_{0.1}$ | 2 | 31 | 0 | 350 | 1.0 | 93.9 | 94 | 88.2 |
| 9 | $Sb_{0.5}K_{0.2}$ | 2 | 31 | 0 | 350 | 1.0 | 96.9 | 97 | 93.8 |
| 10 | $Sb_{0.5}Cs_{0.05}$ | 2 | 31 | 0 | 350 | 1.0 | 75.6 | 92 | 69.3 |
| 11 | '' | 2 | 31 | 0 | 375 | 1.0 | 83.1 | 86 | 71.6 |
| 12 | $Sb_{0.5}Tl_{0.2}$ | 2 | 31 | 0 | 350 | 1.0 | 81.6 | 98 | 80.0 |

UNITED STATES PATENT OFFICE
CERTIFICATE OF CORRECTION

PATENT NO. : 3,911,039
DATED : October 7, 1975
INVENTOR(S) : Robert K. Grasselli, et al It is certified that error appears in the above-identified patent and that said Letters Patent are hereby corrected as shown below:

Column 1: Line 49, "method" should be --methods--

Column 2: Line 26, title "Specific Embodiments" should be inserted

Column 2: Line 38, "4$_2$O" should be --4H$_2$O--

Column 2: Line 41, "Bi(NO$_3$)$_e$" should be --Bi(NO$_3$)$_3$--

Column 4: Line 44, "Sb$_1$" should read -- Sb$_a$ --.

*Signed and Sealed this*

Twenty-eighth Day of December 1976

[SEAL]

Attest:

RUTH C. MASON
*Attesting Officer*

C. MARSHALL DANN
*Commissioner of Patents and Trademarks*